O. C. CROMWELL.
PROCESS OF MANUFACTURING A DRAFT YOKE FOR RAILWAY CARS.
APPLICATION FILED JUNE 7, 1913.
1,125,664.
Patented Jan. 19, 1915.
3 SHEETS—SHEET 1.
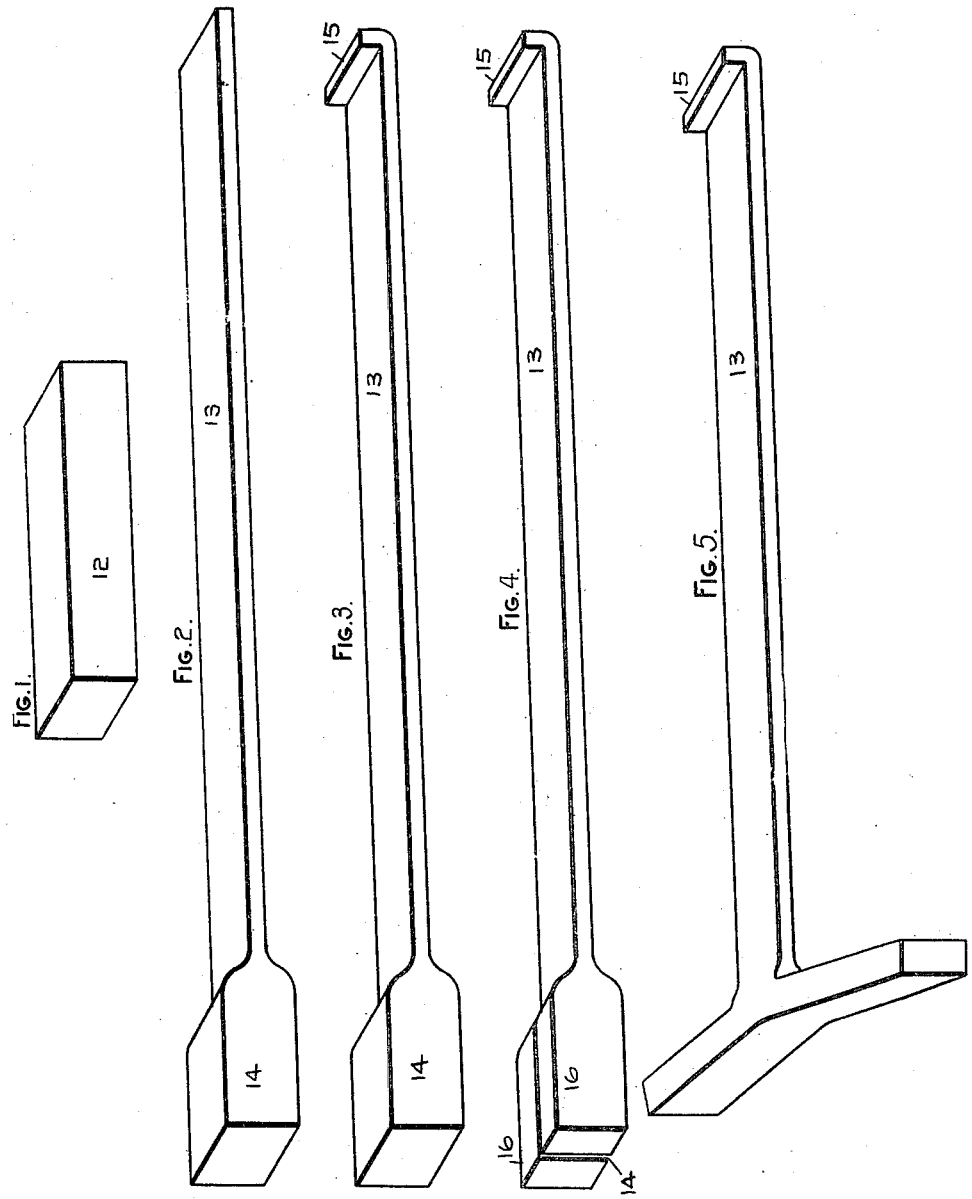
WITNESSES:
Hans M. Rachlitz
Eleanor L. Nash
INVENTOR.
Oliver C. Cromwell
BY George J. Height
HIS ATTORNEY.

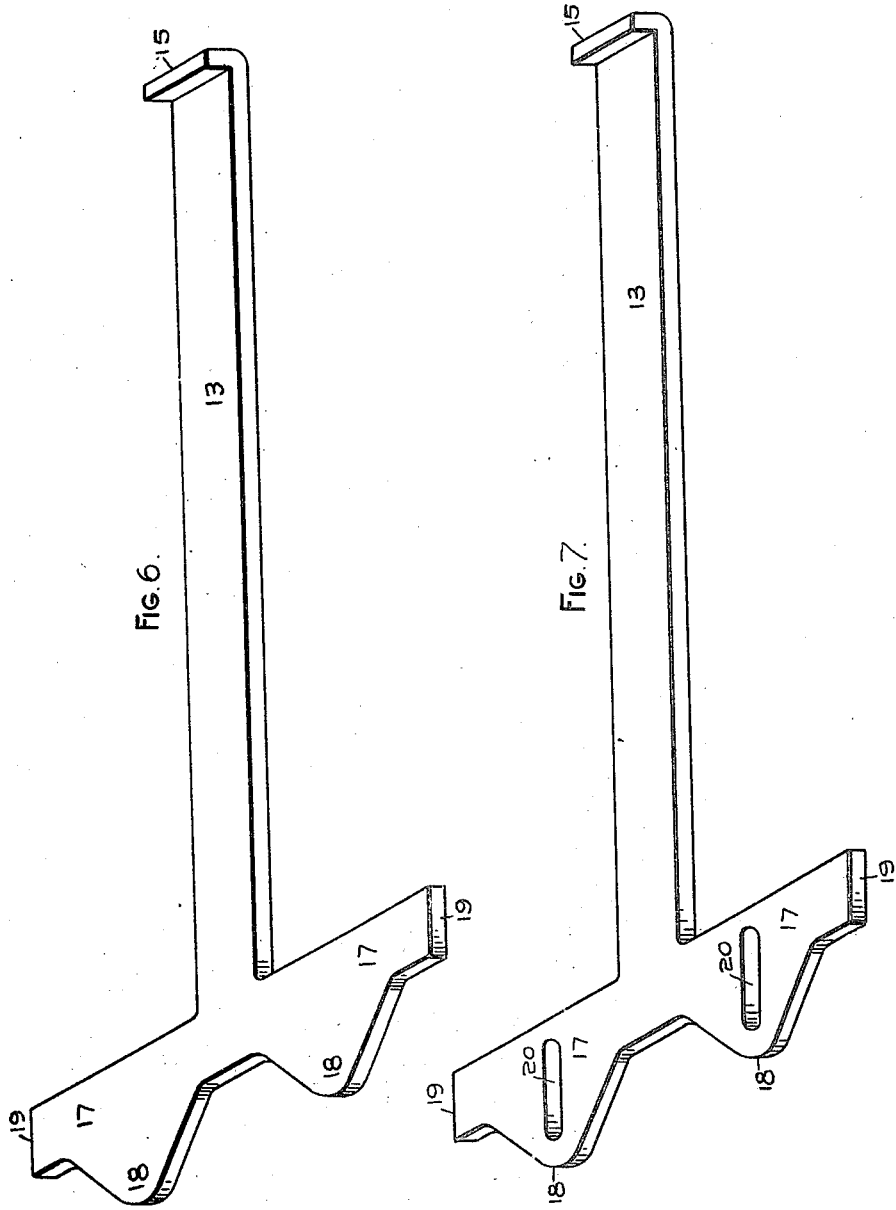

O. C. CROMWELL.
PROCESS OF MANUFACTURING A DRAFT YOKE FOR RAILWAY CARS.
APPLICATION FILED JUNE 7, 1913.
1,125,664.
Patented Jan. 19, 1915.
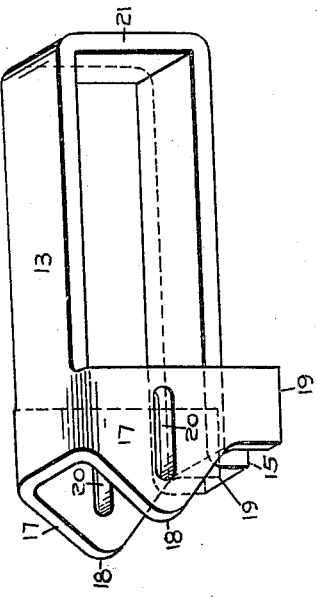
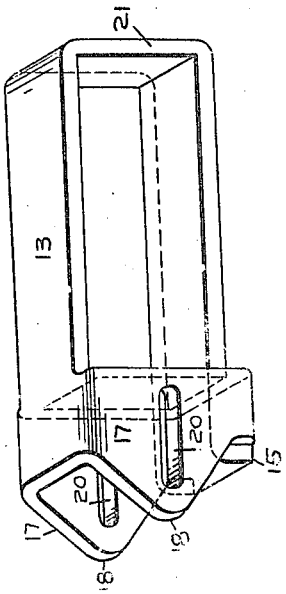
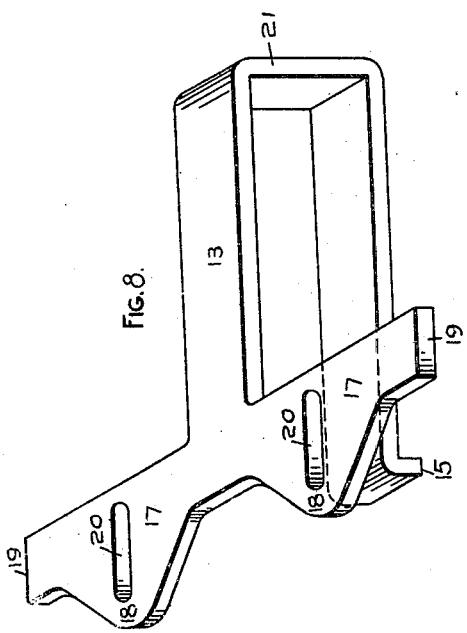
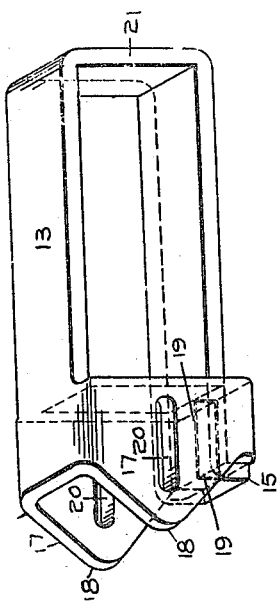
WITNESSES:
INVENTOR.
Oliver C. Cromwell
BY
HIS ATTORNEY.

UNITED STATES PATENT OFFICE.

OLIVER C. CROMWELL, OF BALTIMORE, MARYLAND.

PROCESS OF MANUFACTURING A DRAFT-YOKE FOR RAILWAY-CARS.

1,125,664.  Specification of Letters Patent.  Patented Jan. 19, 1915.

Application filed June 7, 1913. Serial No. 772,217.

*To all whom it may concern:*

Be it known that I, OLIVER C. CROMWELL, a citizen of the United States, residing at Baltimore, in the State of Maryland, have invented a certain new and useful Improvement in a Process of Manufacturing a Draft-Yoke for Railway-Cars, of which the following is a full, clear, concise, and exact description, reference being had to the accompanying drawings, forming a part of this specification.

My invention relates to a process of manufacturing a draft yoke for railway cars.

The object of my invention is to provide a simple process of manufacturing a draft yoke having a hollow box-like opening to receive the draw bar.

In the drawings forming a part of this specification Figure 1 is a perspective view of a billet of yoke material. Fig. 2 is a perspective view of said material drawn to a bar having an enlarged end. Fig. 3 is a perspective view of said bar with a lug at one end. Fig. 4 is a perspective view with the enlarged end of the bar split. Fig. 5 is a perspective view showing said split ends outwardly turned. Fig. 6 is a perspective view showing the outwardly turned ends, each formed into a plate, having forwardly projecting ears. Fig. 7 is a perspective view showing a slot in each of said plates. Fig. 8 is a perspective view showing the bar formed into a U-shape. Fig. 9 is a perspective view showing the outwardly turned plates at one end of the bar bent to meet the sides of the bar adjacent its other end. Fig. 10 is a perspective view showing the ends of the said plates turned to engage the lug. Fig. 11 is a perspective view showing the completed draft yoke.

Referring to the drawings the numeral 12 represents a billet of yoke material, preferably rectangular in shape.

To manufacture a draft yoke having a hollow box-like opening to receive the draw bar my process consists in drawing the billet 12 to a bar 13, preferably flat, having a comparatively enlarged end 14, then transversely bending the other end to form the lug 15. The enlarged end 14 of the bar is then vertically split, as illustrated in Fig. 4 of the drawings, and the split ends 16, 16, turned outwardly to form a T-head, as illustrated in Fig. 5 of the drawings. The T-head is then flattened into plates 17, 17, each plate preferably having a forwardly extending ear 18, 18. Each plate is then provided intermediate the bar 13 and the free end 19 of the plate with a longitudinal slot 20. The bar 13 is then bent into a U-shape, forming a U-shaped yoke strap 21 with the lug 15 outwardly turned. The plates 17, 17 at one end of the yoke strap are then bent to engage the sides of the yoke strap at its other end, as illustrated in Fig. 9 of the drawings. The free ends 19, 19 of the plates 17 are each inwardly turned to engage the other end of the yoke strap.

It will be apparent that the lug 15 may be dispensed with, or that a plurality of lugs or different varieties of lugs may be formed and employed. I prefer, however, to employ the single lug 15 illustrated in the drawings, and to turn the ends 19, 19 of the plates 17 inwardly back of the lug 15. The final step in the process consists in welding the plates at one free end of the yoke strap to its other end, forming the draft yoke illustrated in Fig. 11 of the drawings, comprising a yoke strap having a hollow box-like member at its free ends to receive a draw bar, and laterally slotted to receive a draw bar key.

I claim:—

1. The process of manufacturing a draft yoke, which consists in splitting one end of a bar of yoke material longitudinally thereof, turning the split ends thus formed outwardly to form a T-head, flattening said ends so that the same extend substantially in the same plane as the main portion of the bar, bending said bar into substantially U-shape, bending the free ends of said flattened T-head to engage the opposite end of the bent yoke strap, and finally welding said ends together.

2. The herein described process of manufacturing draft yokes, which consists in splitting one end of a bar longitudinally thereof and then turning the split ends outwardly to form a T-head, flattening said outwardly bent ends so that they extend substantially in the same plane as the main body of the bar, then bending the bar into U-shape in a plane substantially perpendicular to the plane of the flattened split ends, and finally uniting the flat split ends to the other end of the original bar to thereby form a head at the front end of the yoke.

OLIVER C. CROMWELL.

Witnesses:
CLEVELAND R. BEALMEAR,
THOS. D. GOLDBERG.